United States Patent
Nishikawa et al.

(10) Patent No.: US 8,297,715 B2
(45) Date of Patent: Oct. 30, 2012

(54) BRAKING SYSTEM

(75) Inventors: Yutaka Nishikawa, Saitama (JP); Kazuya Takenouchi, Saitama (JP); Takehiko Nanri, Saitama (JP); Masaie Kato, Saitama (JP); Yoko Uno, Saitama (JP); Shinji Takayanagi, Saitama (JP); Hiroshi Ishihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1036 days.

(21) Appl. No.: 12/236,213

(22) Filed: Sep. 23, 2008

(65) Prior Publication Data
US 2009/0096283 A1    Apr. 16, 2009

(30) Foreign Application Priority Data
Sep. 25, 2007    (JP) ................ 2007-247551

(51) Int. Cl.
*B60T 13/00*    (2006.01)
(52) U.S. Cl. ............. 303/9.64; 303/155; 303/115.2; 303/116.2
(58) Field of Classification Search ............ 303/9.64, 303/155, 115.1, 115.2, 116.2
See application file for complete search history.

(56) References Cited

U.S. PATENT DOCUMENTS

| | | | |
|---|---|---|---|
| 6,109,703 A | 8/2000 | Takahashi et al. | |
| 6,267,454 B1 | 7/2001 | Takahashi et al. | |
| 7,322,657 B2* | 1/2008 | Matsuhashi | 303/113.4 |
| 7,331,641 B2* | 2/2008 | Kusano | 303/114.1 |
| 7,549,710 B2* | 6/2009 | Takenouchi et al. | 303/9.64 |
| 7,841,671 B2* | 11/2010 | Nakayama et al. | 303/9.64 |
| 2001/0048243 A1* | 12/2001 | Nakano | 303/117.1 |
| 2002/0125764 A1 | 9/2002 | Sakamoto | |
| 2002/0140286 A1* | 10/2002 | Ishimura et al. | 303/155 |
| 2006/0131953 A1* | 6/2006 | Nakayama et al. | 303/122 |
| 2006/0131954 A1* | 6/2006 | Ogawa et al. | 303/122.09 |
| 2006/0138858 A1* | 6/2006 | Nakayama et al. | 303/9.64 |
| 2007/0228816 A1* | 10/2007 | Nakamura et al. | 303/113.2 |
| 2008/0001474 A1* | 1/2008 | Takenouchi et al. | 303/119.2 |
| 2009/0216416 A1* | 8/2009 | Nanri et al. | 701/70 |
| 2010/0244548 A1* | 9/2010 | Nishikawa et al. | 303/9.64 |

FOREIGN PATENT DOCUMENTS

| | | |
|---|---|---|
| EP | 1671863 A2 | 6/2006 |
| EP | 1873029 A1 | 1/2008 |
| JP | 2006-193136 A | 7/2006 |

* cited by examiner

*Primary Examiner* — Bradley King
(74) *Attorney, Agent, or Firm* — Birch, Stewart, Kolasch & Birch, LLP (57) ABSTRACT

A braking system includes first pressure sensors 35, 35 which are provided to braking pipes 41, 41 which constitute first input-side pressure sensors for detecting a liquid pressure on a front-wheel-master-cylinder-25 side and a rear-wheel-master-cylinder-82 side, and second pressure sensors 36, 36 which are provided at positions closer to a stroke-simulator-28 side than second solenoid-operated valves 31, 31 of braking pipes 27,27 which constitute second input-side pressure sensors for detecting a liquid pressure on the stroke-simulator-28 side.

13 Claims, 7 Drawing Sheets

BRAKING SYSTEM

CROSS-REFERENCE TO RELATED APPLICATIONS

This nonprovisional application claims priority under 35 U.S.C. §119(a) on Patent Application No. 2007-247551, filed in Japan on Sep. 25, 2007, the entirety of which is incorporated herein by reference.

BACKGROUND OF THE INVENTION

1. Field of the Invention

The present invention relates to the improvement of a braking system.

2. Background of the Invention

A hydraulic braking device is popularly used in a vehicle such as a motorcycle. There has been known a hydraulic braking device in which a braking input side where a liquid pressure is generated when a rider operates a braking operation part and a braking output side where the liquid pressure is supplied to wheel braking means. The braking input side and the braking output side are communicated with each other or interrupted from each other due to an operation of a solenoid-operated open/close valve.

As an example of such a hydraulic braking device, there has been known a so-called by-wire-type braking system which electrically detects a control variable of the braking operation part, controls a liquid-pressure generation device based on the detection value so as to generate liquid pressure, and operates a wheel braking means.

In such a by-wire-type braking system, to enable braking corresponding to the braking operation, a pressure sensor is provided to a braking input side. To perform a malfunction diagnosis of the pressure sensor, output values of a plurality of pressure sensors are compared with each other.

For example, JP-A-2006-193136 describes an example in which the malfunction diagnosis is performed using a plurality of such pressure sensors. The constitution shown in FIG. 1 of JP-A-2006-193136 is explained hereinafter.

Figure 1:
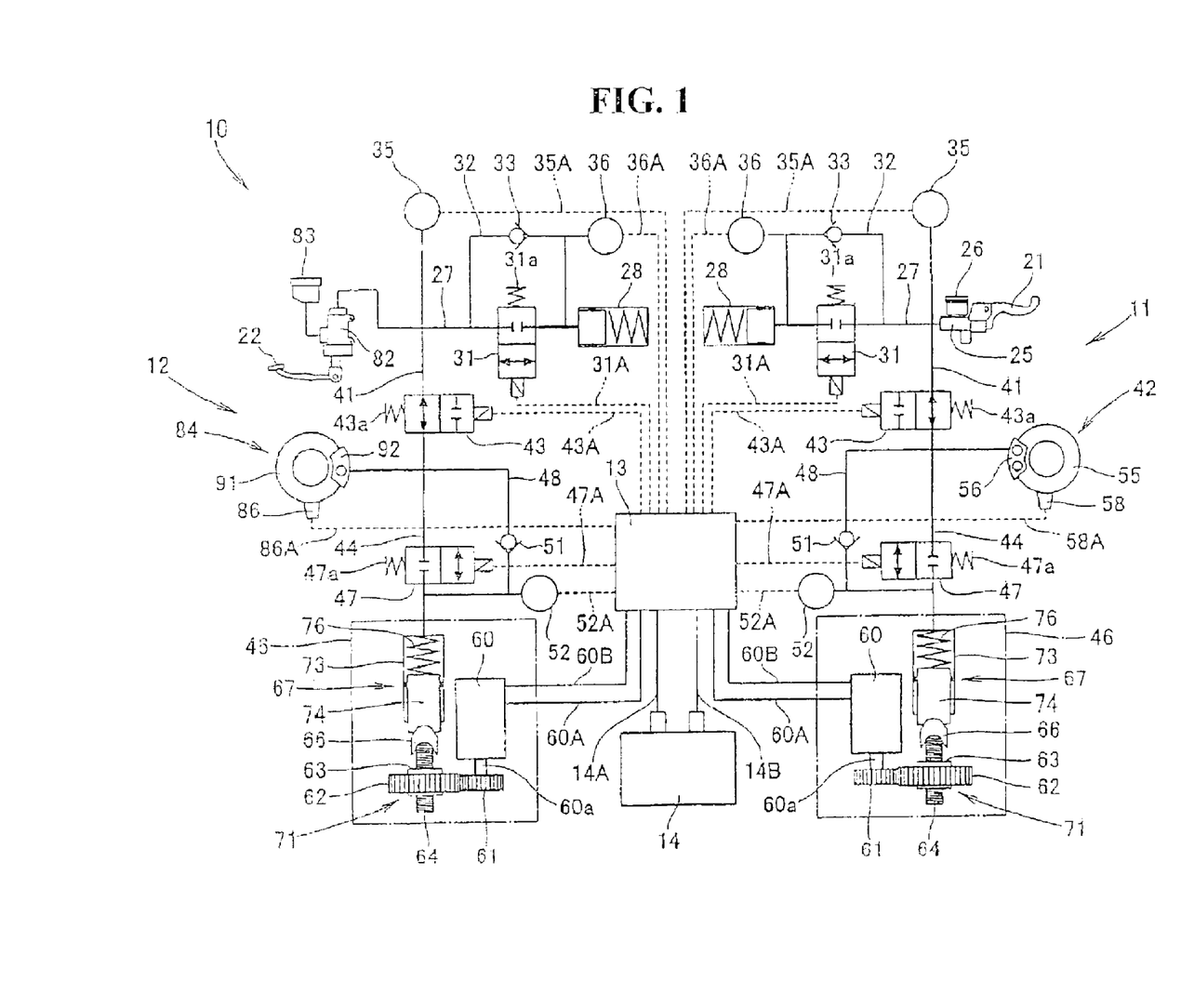
FIG. 1 is a system view of a vehicle-use braking system according to an embodiment of the present invention.

A braking circuit 1a on a front-wheel side includes a master cylinder 3 which is interlockingly operated with a braking operation part 2 which constitutes a braking lever, a braking caliper 4 which is operated due to liquid pressure generated in the master cylinder 3, a main braking passage 5 which connects the master cylinder 3 and the braking caliper 4 respectively, and a first solenoid-operated open/close valve V1 provided to the main braking passage 5. Here, using the first solenoid-operated open/close valve V1 as a border, a first pressure sensor 28A and a second pressure sensor 28B are arranged on a braking input side which constitutes a master-cylinder-3 side, while using the first solenoid-operated open/close valve V1 as the border, a pressure sensor 29 is arranged on a braking output side which constitutes a braking caliper-4 side.

As described above, by arranging two pressure sensors, that is, the first pressure sensor 28A and the second pressure sensor 28B on the braking input side, it is possible to surely perform the malfunction diagnosis of these two sensors by comparing the detection values of the first pressure sensor 28A and the second pressure sensor 28B.

Further, a general liquid-pressure detection sensor used in these days is configured such that a pressure change is converted into a strain amount and an electric signal corresponding to the strain amount is outputted. Accordingly, when the liquid-pressure detection sensor is of a type which can detect a fine pressure change immediately after starting braking, the pressure resistance property against a high pressure tends to be lowered. On the other hand, when the liquid-pressure detection sensor is of a type which possesses high pressure resistance property against high pressure, the resolution for measuring a fine pressure change is lowered.

SUMMARY OF THE INVENTION

Accordingly, it is an object of the present invention to provide a vehicle-use braking system which can measure pressure within a proper range while surely performing malfunction diagnosis.

In accordance with a first aspect of the present invention, there is provided a braking system includes a master cylinder interlockingly operated with an operation of a braking operation part, a wheel braking means which generates a braking force by a liquid pressure obtained by operating the master cylinder, a main braking passage which connects the master cylinder and the wheel braking means, a normally-open first solenoid-operated open/close valve which is provided to the main braking passage for establishing/interrupting communication between the master cylinder and the wheel braking means, a stroke simulator which applies a pseudo reaction force corresponding to a control variable of the braking operation part to the master cylinder, a branch passage which is branched from the first solenoid-operated open/close valve of the main braking passage on a master cylinder side and is connected to the stroke simulator, a normally-closed second solenoid-operated open/close valve which is provided to the branch passage for establishing/interrupting the communication between the master cylinder and the stroke simulator, and a hydraulic modulator which generates liquid pressure by an electrically-operated actuator and operates the wheel braking means with the liquid pressure, wherein the braking system further includes a first input-side pressure sensor which is provided to the main braking passage for detecting the liquid pressure on the master cylinder side, and a second input-side pressure sensor which is provided at a position closer to the stroke-simulator side than the second solenoid-operated open/close valve of the branch passage for detecting pressure on the stroke simulator side.

By providing the normally-closed second solenoid-operated open/close valve for establishing/interrupting the communication between the master cylinder and the stroke simulator, the frequency that the second solenoid-operated open/close valve is opened is decreased. Therefore, even when the large liquid pressure is generated at the position closer to the master cylinder side than the second solenoid-operated open/close valve of the branch passage, the number of times that the liquid pressure is transmitted to the second input-side pressure sensor is decreased whereby the durability of the second input-side pressure sensor is enhanced.

Accordingly, for example, by constantly comparing the respective detection values of the first input-side pressure sensor and the second input-side pressure sensor, it is possible to perform the malfunction diagnosis of these two sensors.

In accordance with a second aspect of the present invention, the measurement resolution of the second input-side pressure sensor is set higher than the measurement resolution of the first input-side pressure sensor. Therefore, the second input-side pressure sensor can detect the finer change of liquid pressure compared to the first input-side pressure sensor.

In accordance with a second aspect of the present invention, the braking system further includes a vehicle speed sensor which detects a speed of a vehicle and a control unit which controls opening and closing of the first and second solenoid-operated open/close valves respectively, wherein the control unit controls opening and closing of the second solenoid-operated open/close valve in accordance with a predetermined threshold value based on a value detected by the vehicle speed sensor.

The control unit compares the detection value of the vehicle speed sensor and the predetermined threshold value, determines that a vehicle is in a traveling state when the detection value of the vehicle speed sensor is larger than the predetermined threshold value, and opens the second solenoid-operated open/close valve.

In accordance with the first aspect of the present invention, the braking system includes the first input-side pressure sensor which is provided to the main braking passage for detecting the liquid pressure on the master cylinder side, and the second input-side pressure sensor which is provided to the position closer to the stroke-simulator side than the second solenoid-operated open/close valve of the branch passage for detecting pressure on the stroke simulator side and hence, by using both of the first input-side pressure sensor and the second input-side pressure sensor, a malfunction diagnosis of these two sensors can be performed. Further, by providing the normally-closed second solenoid-operated open/close valve to the branch passage even when a large liquid pressure is generated by the master cylinder, the branch passage is closed. Therefore, the liquid pressure is hardly applied to the second input-side pressure sensor.

In accordance with the first aspect of the present invention, since the measurement resolution of the second input-side pressure sensor is set higher than the measurement resolution of the first input-side pressure sensor, by using the second input-side pressure sensor, a smaller liquid pressure change can be detected compared with the first input-side pressure sensor and hence, highly accurate braking control can be performed. Further, only when the normally-closed second solenoid-operated open/close valve is opened, the pressure is applied to the second input-side pressure sensor and hence, the second input-side pressure sensor is hardly affected by the fluctuation of pressure.

In accordance with the first aspect of the present invention, the braking system further includes the vehicle speed sensor which detects the speed of the vehicle and the control unit which controls opening and closing of the first and second solenoid-operated open/close valves respectively. The control unit controls the opening and closing of the second solenoid-operated open/close valve in accordance with a predetermined threshold value based on a value detected by the vehicle speed sensor. Accordingly, when the control unit determines that the vehicle is in a traveling state by comparing the detected value of the vehicle speed sensor with the predetermined threshold value, the second solenoid-operated open/close valve is opened and the liquid pressure can be measured by the high-sensitivity second input-side pressure sensor and hence, highly accurate braking control can be performed.

Further, when the vehicle is stopped, the second solenoid-operated open/close valve is in a closed state. Therefore, the second input-side pressure sensor is hardly affected by the fluctuation of pressure generated by the braking operation when the vehicle is stopped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a system view of a vehicle-use braking system according to an embodiment of the present invention. The braking system 10 includes a front-wheel braking device 11 which applies braking to a front wheel of a motorcycle, a rear-wheel braking device 12 which applies braking to a rear wheel of the motorcycle, a control unit 13 which controls opening/closing of a plurality of solenoid-operated valves provided to a braking liquid passage which is respectively provided to the front-wheel braking device 11 and the rear-wheel braking device 12, and a battery 14 which supplies electricity to the front-wheel braking device 11, the rear-wheel braking device 12 and the control unit 13. The braking system 10 is of a by-wire type which electrically detects a control variable of a braking lever 21 provided to the front-wheel braking device 11 and a control variable of a braking pedal 22 provided to the rear-wheel braking device 12, respectively, and generates braking liquid pressures corresponding to these detected control variables so as to independently or interlockingly apply braking to the front wheel and the rear wheel.

The front-wheel braking device 11 includes a braking lever 21, a front-wheel master cylinder 25 which is connected to the braking lever 21 and generates braking liquid pressure by operating the braking lever 21, a reservoir tank 26 which stores braking liquid which flows in or out from the inside of the front-wheel master cylinder 25, a front-wheel disc braking device 42 which applies braking to the front wheel, a braking pipe 41 constituting a main braking passage which connects the front-wheel master cylinder 25 and a front-wheel disc braking device 42, a first solenoid-operated valve 43 constituting a first solenoid-operated open/close valve which is provided to a midst portion of the braking pipe 41, a braking pipe 27 constituting a branch passage which is branched from the first solenoid-operated valve 43 of the braking pipe 41 on a front-wheel master cylinder 25 side, a stroke simulator 28 which is connected to the front-wheel master cylinder 25 by way of the braking pipe 27, a second solenoid-operated valve 31 constituting a second solenoid-operated open/close valve which is provided to a midst portion of the braking pipe 27, a bypass pipe 32 which is provided to the braking pipe 27 such that the bypass pipe 32 bypasses the second solenoid-operated valve 31, a one-way valve 33 which is provide to a midst portion of the bypass pipe 32, a first pressure sensor 35 which is connected to the front-wheel master cylinder 25, a second pressure sensor 36 which is connected to the bypass pipe 32, a power unit 46 which is connected to the braking pipe 41 by way of a braking pipe 44, a third solenoid-operated valve 47 which is provided to a midst portion of the braking pipe 44, a bypass pipe 48 which is connected to the braking pipe 44 such that the bypass pipe 48 bypasses the third solenoid-operated valve 47, a one-way valve 51 which is provided to a midst portion of the bypass pipe 48, and a third pressure sensor 52 which is connected to the bypass pipe 48. Lead lines 14A, 14B connect the control unit 13 and the battery 14 with each other.

The stroke simulator 28 generates a pseudo reaction by the liquid pressure which is generated in the front-wheel master cylinder 25 corresponding to a control variable of the braking lever 21 thereby generating operation feeling similar to operation feeling such as a play generated on a braking lever of a usual hydraulic braking device of a type different from a by-wire type to a hand of a rider who operates the braking lever 21.

The second solenoid-operated valve 31 is usually closed due to an elastic force of a compression coil spring 31a (normally-closed second solenoid-operated open/close valve), and is opened against the elastic force of the compression coil spring 31a upon reception of a control signal outputted from the control unit 13 via the lead line 31A.

The bypass pipe 32 and the one-way valve 33 are provided for releasing the remaining pressure of the braking liquid generated in the stroke simulator 28. The one-way valve 33 allows only the flow of the braking liquid to a front-wheel-master-cylinder-25 side from a stroke-simulator-28 side.

The first pressure sensor 35 is provided to the braking pipe 41 and is for detecting the pressure in the front-wheel master cylinder 25 by way of the braking pipe 41, and is connected to the control unit 13 using the lead line 35A.

The second pressure sensor 36 is provided at a position closer to the stroke-simulator-28 side than the second solenoid-operated valve 31 of the braking pipe 27 and is connected to the braking pipe 27 by way of the bypass pipe 32 for detecting the pressure in the stroke simulator 28. The second pressure sensor 36 is connected to the control unit 13 via the lead line 36A.

Further, the second pressure sensor 36 is provided to the stroke simulator 28 side of the second solenoid-operated valve 31. Therefore, the second pressure sensor 36 is hardly affected by the pressure change at the usual time.

The resolution with which the second pressure sensor 36 measures the liquid pressure is higher than the corresponding resolution of the first pressure sensor 35. That is, the pressure resistance property of the first pressure sensor 35 is higher than the pressure resistance property of the second pressure sensor 36.

Further, the respective liquid pressure detection values of the first pressure sensor 35 and the second pressure sensor 36 are compared with each other by the control unit 13 so as to perform the malfunction diagnosis.

The front-wheel disc braking device 42 includes a braking disc 55 and a braking caliper 56 which applies braking to the braking disc 55. The braking caliper 56 is connected to the above-mentioned braking pipe 41. A front-wheel wheel speed sensor 58 is for acquiring a wheel speed of the front wheel by detecting a rotational speed of the braking disc 55. The front-wheel wheel speed sensor 58 is connected to the control unit 13 using a lead line 58A.

The first solenoid-operated valve 43 is usually opened due to an elastic force of a compression coil spring 43a (normally-open first solenoid-operated open/close valve), and is closed against the elastic force of the compression coil spring 43a upon reception of a control signal outputted from the control unit 13 via the lead line 43A.

The power unit 46 includes an electrically-operated motor 60, a first gear 61 mounted on a rotary shaft 60a of the electrically-operated motor 60, a second gear 62 meshed with the first gear 61, a nut member 63 integrally mounted on the second gear 62, a screw shaft 64 threadedly joined to the nut member 63 by way of a plurality of ball (not shown in the drawings), and a power cylinder device 67 brought into contact with the screw shaft 64 by way of a pushing member 66. Lead lines 60A, 60B connect the control unit 13 and the electrically-operated motor 60 for supplying electricity to the electrically-operated motor 60.

The nut member 63, the plurality of balls and the screw shaft 64 described above constitute a ball screw mechanism 71.

The power cylinder device 67 includes a cylinder body 73, a power piston 74 movably inserted into the inside of the cylinder body 73 and having one end with which the pushing member 66 is brought into contact, and a compression coil spring 76 arranged between another end of the power piston 74 and a bottom of the cylinder body 73. The braking pipe 44 is connected to a bottom of the cylinder body 74.

The third solenoid-operated valve 47 is usually closed due to an elastic force of a compression coil spring 47a) and is opened against the elastic force of the compression coil spring 47a upon reception of a control signal outputted from the control unit 13 via the lead line 47A.

The bypass pipe 48 and the one-way valve 51 are provided for releasing residual pressure of the braking liquid generated in the inside of the cylinder body 73 of the power unit 46. The one-way valve 51 allows only the flow of the braking liquid toward the braking caliper 56 side from the power unit 46 side.

The third pressure sensor 52 detects liquid pressure in the cylinder body 73 and is connected to the control unit 13 using the lead line 52A.

The control unit 13 controls opening/closing of the first solenoid-operated valve 43, the second solenoid-operated valve 31 and the third solenoid-operated valve 47 and driving of the electrically-operated motor 60 based on pressure signals from the first pressure sensor 35, the second pressure sensor 36 and the third pressure sensor 52 and a front-wheel wheel speed signal from the front-wheel wheel speed sensor 58.

The rear-wheel braking device 12 has the substantially equal basic constitution with the front-wheel braking device 11. However, the braking pedal 22 is provided in place of the braking lever 21, a rear-wheel master cylinder 82 is provided in place of the front-wheel master cylinder 25, the reservoir tank 83 is provided in place of the reservoir tank 26, a rear-wheel braking device 84 is provided in place of the front-wheel disc braking device 42, a rear-wheel wheel speed sensor 86 is provided in place of the front-wheel wheel speed sensor 58, and a lead line 86A described later is provided in place of the lead line 58A. Other constitutions of the rear-wheel braking device 12 are indicated by the same symbols used for indicating the identical parts of the front-wheel braking device 11.

The rear-wheel braking device 84 includes a braking disc 91 and a braking caliper 92 which applies braking to the braking disc 91. The braking caliper 92 is connected to the braking pipe 41.

The rear-wheel wheel speed sensor 86 detects a rotational speed of the braking disc 91, that is, a wheel speed of the rear wheel, and is connected to the control unit 13 using the lead line 86A.

Although the front-wheel wheel speed sensor 58 and the rear-wheel wheel speed sensor 86 are provided for detecting the wheel speeds of the front wheel and the rear wheel, a vehicle body speed is obtained by the control unit 13 based on these wheel speeds. Therefore, these wheel speed sensors 58, 86 also function as the vehicle speed sensors.

A predetermined threshold value is set with respect to the vehicle body speed, for example. This threshold value and the vehicle body speed obtained based on the wheel speeds detected by the front-wheel wheel speed sensor 58 and the rear-wheel wheel speed sensor 86 are compared with each other by the control unit 13, and opening/closing of the first solenoid-operated valve 43, the second solenoid-operated valve 31 and the third solenoid-operated valve 47 is controlled by the control unit 13.

Figure 2:
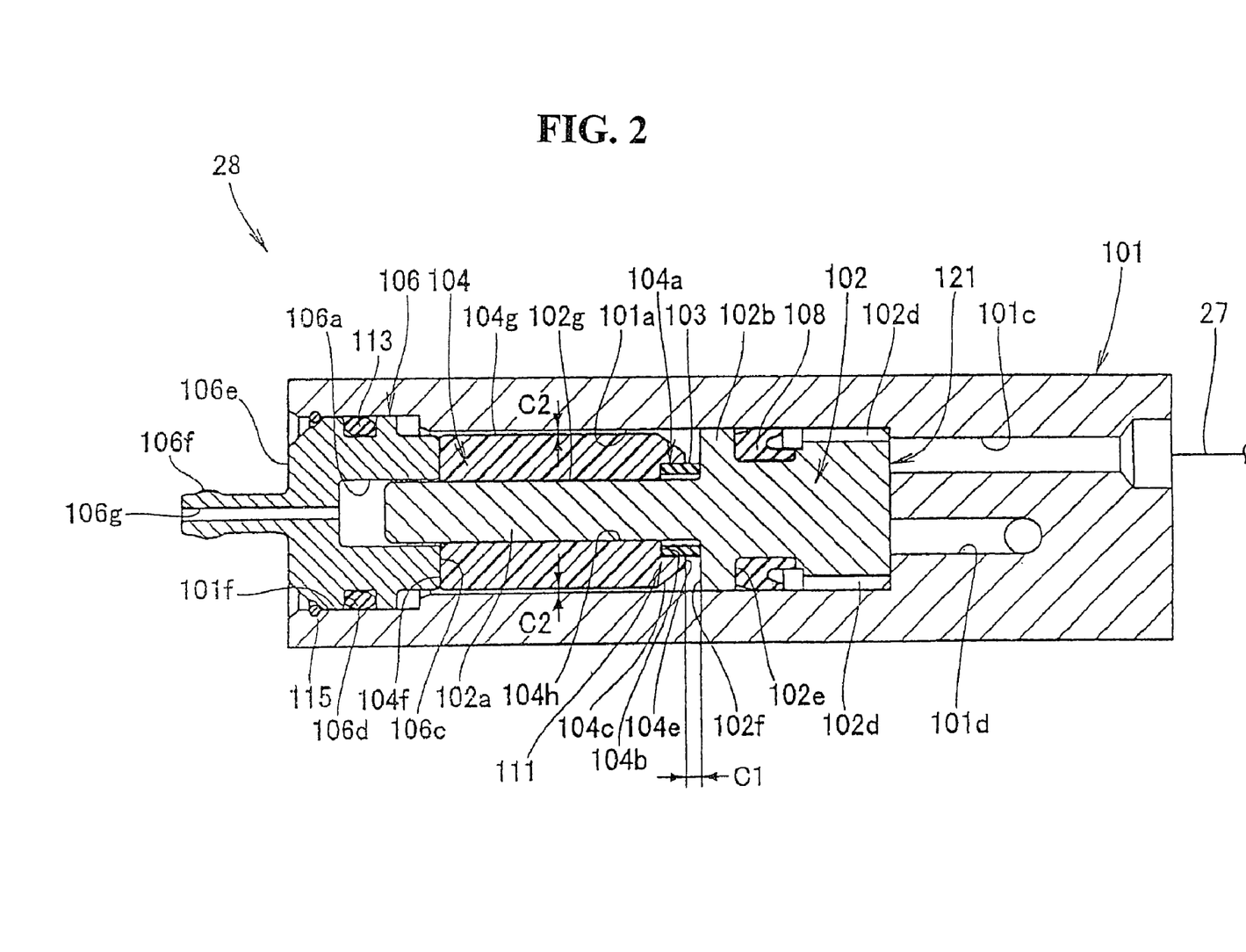
FIG. 2 is a cross-sectional view of a stroke simulator according to an embodiment of the present invention.

FIG. 2 is a cross-sectional view of the stroke simulator according to an embodiment of the present invention. The stroke simulator 28 includes a cylinder portion 101, a piston 102 movably inserted into a cylinder bore 101a formed in the cylinder portion 101, a rubber-made first elastic member 103 fitted in a proximal end side of a small-diameter portion 102a formed on the piston 102 with a gap in the radial direction, a resin-made second elastic member 104 fitted on the small-diameter portion 102a and accommodating a portion of the first elastic member 103 in the inside of an annular stepped portion 104a formed on an inner peripheral surface of an end portion thereof, and an end portion closing member 106 including a hollow portion 106a which allows the small-diameter portion 102a to enter therein or to retract therefrom and closes one end side of the cylinder bore 101a.

The cylinder portion 101 includes a braking liquid passage 101c which has one end thereof connected with the braking pipe 27 and another end thereof communicated with the cylinder bore 101a, and a leak passage 101d which leaks an extra braking liquid at the time of filling the braking liquid in the inside of the cylinder bore 101a.

The piston 102 is constituted of a large-diameter portion 102b sliding in the cylinder bore 101a, and the small-diameter portion 102a integrally formed on an end portion of the large-diameter portion 102b. The large-diameter portion 102b is a member which forms, on an outer peripheral surface thereof, a plurality of axially extending axial grooves 102d in which the braking liquid is filled in a state that the axial grooves 102d are communicated with a liquid chamber 121 formed between the cylinder bore 101a and the piston 102, and an annular groove 102e which mounts a sealing member 108 for sealing a gap between the cylinder bore 101a and the large-diameter portion 102b therein.

The first elastic member 103 is formed of a rubber made cylindrical body. One end of the first elastic member 103 is brought into contact with an end surface 102f of the large-diameter portion 102b, and another end of the first elastic member 103 is brought into contact with a bottom surface 104b of the stepped portion 104a (a recessed portion 111 described later) of the second elastic member 104.

The second elastic member 104 is formed of a resin-made body having a spring constant larger than a spring constant of the first elastic member 103. The second elastic member 104 is arranged in series with the first elastic member 103 between the piston 102 and the end portion closing member 106. The stepped portion 104a and the chamfered portion 104c are formed on one end of the second elastic member 104. Further, a hollow portion 104h for allowing fitting of the small-diameter portion 102a therein is formed in the second elastic member 104.

The annular stepped portion 104a formed on an inner peripheral surface of the end portion of the second elastic member 104, and an outer peripheral surface 102g of the small-diameter portion 102a of the piston 102 form the annular recessed portion 111, and a portion of the first elastic member 103 is accommodated in the inside of the recessed portion 111.

A gap C1 is defined between the end surface 102f of the large-diameter portion 102b and one end surface 104e of the second elastic member 104, and a gap C2 is defined between the outer peripheral surface 104g of the second elastic member 104 and the cylinder bore 101a.

Another end surface 104f of the second elastic member 104 is brought into contact with an end surface 106c of the end-portion closing member 106.

The above-mentioned gap C2 and chamfered portion 104c are provided for allowing the second elastic member 104 to expand in the radial direction in the inside of the cylinder bore 101a when the second elastic member 104 is deformed by compression in the axial direction. By changing sizes of the gap C2 and the chamfered portion 104c, it is possible to easily change a reaction force (that is, a spring constant of the second elastic member 104) which is generated when the second elastic member 104 is deformed by compression.

The end-portion closing member 106 is a member including a hollow portion 106a, an annular O-ring groove 106d for mounting an O-ring 113 which seals a gap between the end-portion closing member 106 and an end-portion large-diameter bore 101f formed in an end portion of the cylinder portion 101, an external projection portion 106f projecting from an end surface 106e facing the outside, and an outside communication hole 106g formed in the inside of the external projecting portion 106f in a penetrating manner such that the outside communication hole 106g is communicated with the outside from the hollow portion 106a. A retainer ring 115 is for preventing removal of the end-portion closing member 106 from the end-portion large-diameter hole 101f.

The manner of operation of the braking system 10 described above is explained hereinafter.

Figure 3:
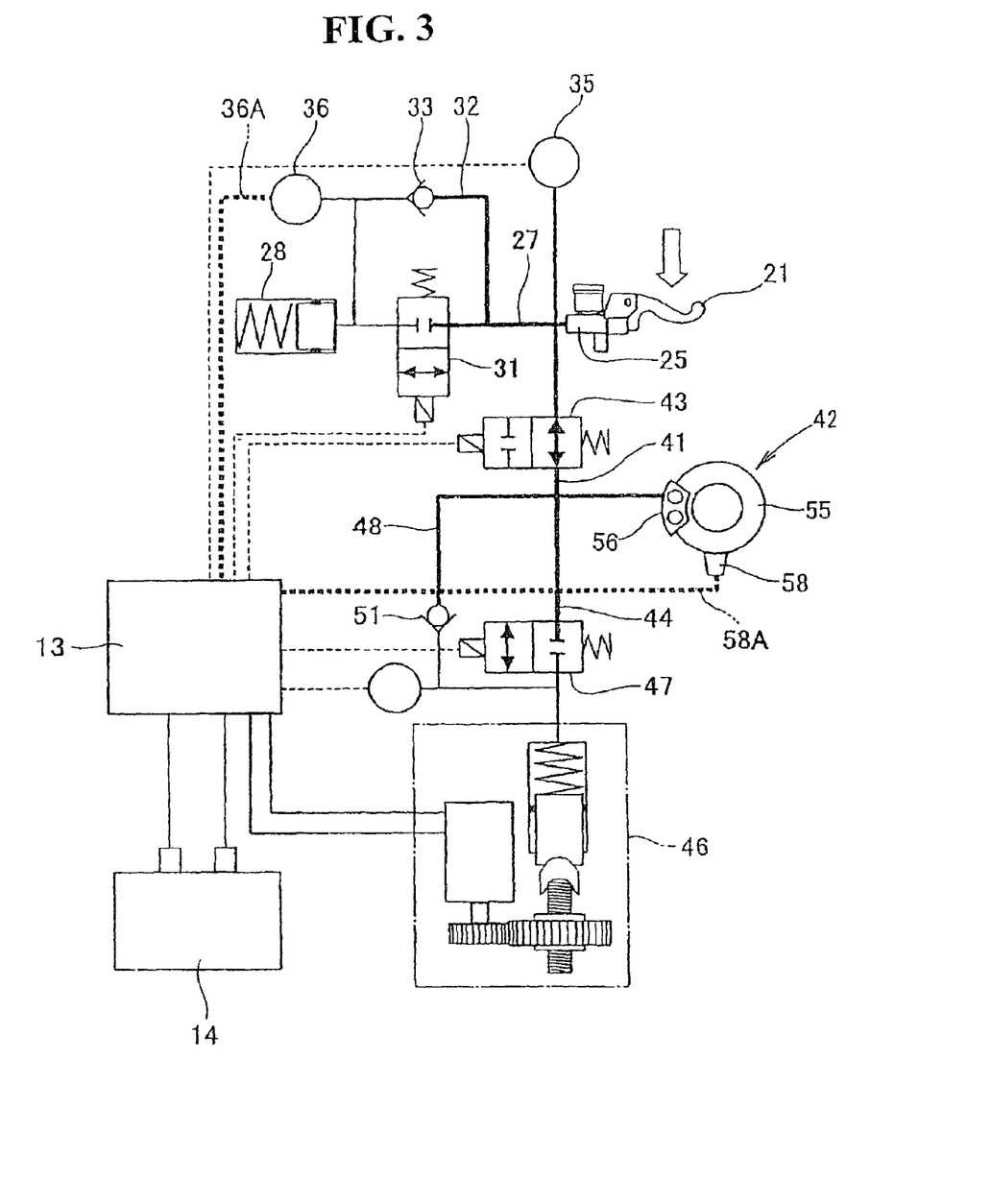
FIG. 3 is a first operation view showing an operation of the braking system according to an embodiment of the present invention.

FIG. 3 is a first operation view showing the manner of operation of the braking system according to an embodiment of the present invention. In the explanation made hereinafter, in the braking system, the portions where the braking liquid pressure is generated, the portions where signals are transmitted, and the portions to which electricity is supplied are indicated by bold lines. Further, since the manner of operation of the front-wheel braking device 11 and the manner of operation of the rear-wheel braking device 12 are substantially equal, the explanation is made mainly with respect to the front-wheel braking device 11 hereinafter.

When an ignition switch of a vehicle is turned off (for example, when the vehicle is stopped or when the vehicle is moved by a driver), or when the ignition switch of the vehicle is turned on and the front-wheel wheel speed detected by the front-wheel wheel speed sensor 58 is zero (0) or less than a predetermined value (that is, it is determined by the control unit 13 that the vehicle is stopped), the second solenoid-operated valve 31 is closed, the first solenoid-operated valve 43 is opened, and the third solenoid-operated valve 47 is closed. Therefore, when the braking lever 21 is operated as indicated by a blanked arrow, a liquid pressure is generated by the front-wheel master cylinder 25 and the liquid pressure is transmitted through a path indicated by the bold line in the drawing. The lead lines 36A, 58A indicated by the bold lines indicate the lead lines 36A, 58A when the ignition switch is turned on.

The above-mentioned description "the front-wheel wheel speed detected by the front-wheel wheel speed sensor 58 is zero (0) or less than a predetermined value" may be "a vehicle body speed (that is, the vehicle speed) obtained by the front-wheel wheel speed sensor 58 and the rear-wheel wheel speed sensor 86 is zero (0) or less than a predetermined value (a threshold value of the vehicle body speed)".

The liquid pressure generated by the front-wheel master cylinder 25 is transmitted to the braking caliper 56 of the front-wheel disc braking device 42. Therefore, the braking caliper 56 applies braking to the braking disc 55 whereby the braking is applied to the front wheel. That is, it is possible to manually apply braking to the front wheel.

In this manner, when it is determined that the vehicle is stopped in the by-wire-type braking system, a liquid pressure is generated manually and the liquid pressure is used to apply braking to the front wheel. This is because when the liquid pressure is generated by the power unit described later and braking is applied to the front wheel, a load is imposed on the power unit. Therefore, the power consumption is increased, while the load is reduced and the power consumption is suppressed by the manual generation of liquid pressure.

Figure 4:
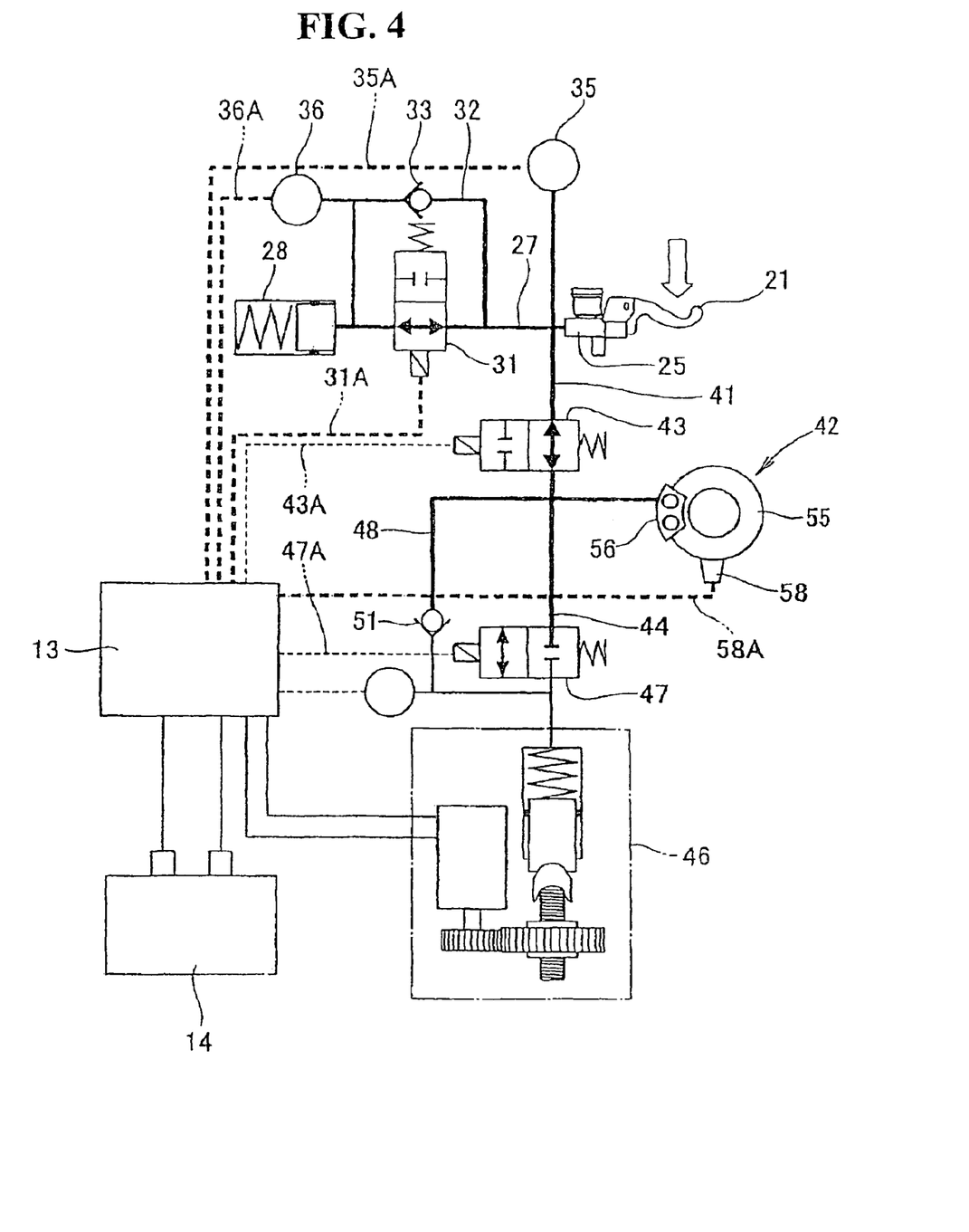
FIG. 4 is a second operation view showing an operation of the braking system according to an embodiment of the present invention.

FIG. 4 is a second operation view showing the manner of operation of the braking system according to an embodiment of the present invention.

When a vehicle starts traveling and the front-wheel wheel speed detected by the front-wheel wheel speed sensor 58 becomes a predetermined value or more, a front-wheel wheel speed signal is outputted to the control unit 13 from the front-wheel wheel speed sensor 58 via the lead line 58A. Therefore, the control unit 13 transmits a valve opening signal to the second solenoid-operated valve 31 based on the front-wheel wheel speed signal. As a result, the second solenoid-operated valve 31 is opened so that the front-wheel master cylinder 25 and the stroke simulator 28 are communicated with each other.

The above-mentioned description "when the front-wheel wheel speed detected by the front-wheel wheel speed sensor 58 becomes a predetermined value or more, the front-wheel wheel speed signal is outputted to the control unit 13 from the front-wheel wheel speed sensor 58 via the lead line 58A and hence, the control unit 13 transmits a valve opening signal to the second solenoid-operated valve 31 based on the front-wheel wheel speed signal" may be "when the vehicle body speed detected by the front-wheel wheel speed sensor 58 and the rear-wheel wheel speed sensor 86 becomes a predetermined value (threshold value of vehicle body speed) or more, the control unit 13 transmits a valve opening signal to the second solenoid-operated valve 31 based on the vehicle speed signal".

In this manner, when the vehicle body speed becomes the predetermined value or more, the second solenoid-operated valve 31 is opened. Therefore, the second pressure sensor 36 hardly receives the fluctuation of pressure attributed to the braking operation at the time of stopping the vehicle.

When the braking lever 21 is operated as indicated by a blanked arrow in such a state, a liquid pressure is generated in the front wheel master cylinder 25, and the liquid pressure is transmitted to the braking caliper 56 of the front-wheel disc braking device 42 whereby braking is applied to the front wheel. The liquid pressure in the stroke simulator 28 is detected by the second pressure sensor 36, and the pressure signal is outputted to the control unit 13 via the lead line 36A.

Figure 5:
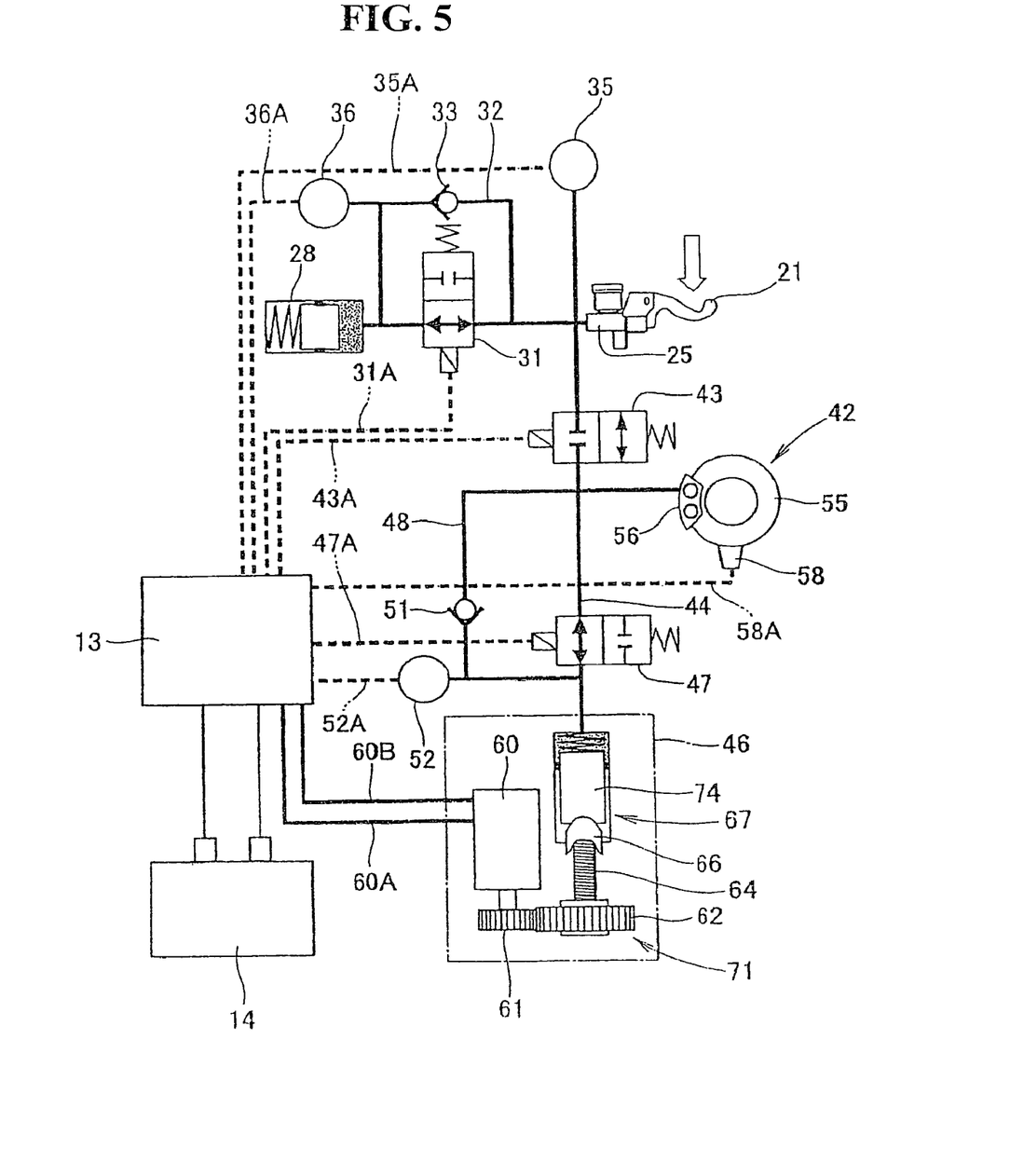
FIG. 5 is a third operation view showing an operation of the braking system according to an embodiment of the present invention.

FIG. 5 is a third operation view showing the manner of operation of the braking system according to an embodiment of the present invention.

In FIG. 4, when liquid pressure detected by the second pressure sensor 36 due to the operation of the braking lever 21 becomes a predetermined value or more, as shown in FIG. 5, the stroke simulator 28 starts an operation thereof, and a valve closing signal is transmitted to the first solenoid-operated valve 43 from the control unit 13 and a valve opening signal is transmitted to the third solenoid-operated valve 47 from the control unit 13 based on a pressure signal from the second pressure sensor 36.

As a result, the first solenoid-operated valve 43 is closed so that the front-wheel master cylinder 25 and the front-wheel disc braking device 42 are disconnected from each other and, at the same time, the third solenoid-operated valve 47 is opened so as to connect the power unit 46 and the front-wheel disc braking device 42.

Further, electricity is supplied to the electrically-operated motor 60 from a motor drive part (not shown in the drawing) arranged in the inside of the control unit 13. As a result, the electrically-operated motor 60 starts an operation thereof and moves the power piston 74. A liquid pressure is generated in the power cylinder device 67 due to the movement of the power piston 74, and the liquid pressure is transmitted to the braking caliper 56 of the front-wheel braking disc device 42 thus applying braking to the front wheel. That is, braking of the front wheel by the by-wire system is performed. Also in such an operation, the stroke simulator 28 is continuously operated.

When braking of the front wheel is performed, braking of the rear wheel by the rear-wheel braking device 12 shown in FIG. 1 based on the input pressure of the front-wheel braking device 11, that is, the braking liquid pressure detected by the second pressure sensor 36 is automatically interlocked with the braking of the front wheel, wherein the braking of the rear wheel is performed in the same manner as the operation of the above-mentioned front-wheel braking device 11.

Further, when braking of the rear wheel is performed, opposite to the above, braking of the front wheel by the front-wheel braking device 11 based on the input pressure of the rear-wheel braking device 12, that is, the braking liquid pressure detected by the second pressure sensor 36 on the rear-wheel braking device 12 side is automatically interlocked with the braking of the rear wheel.

Figure 6A:
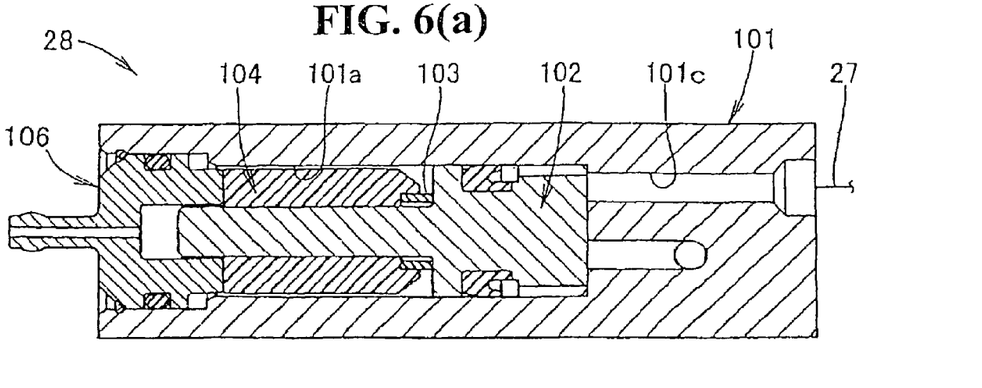
FIGS. 6(a)-(c) are operation views of the stroke simulator according to an embodiment of the present invention.
Figure 6B:
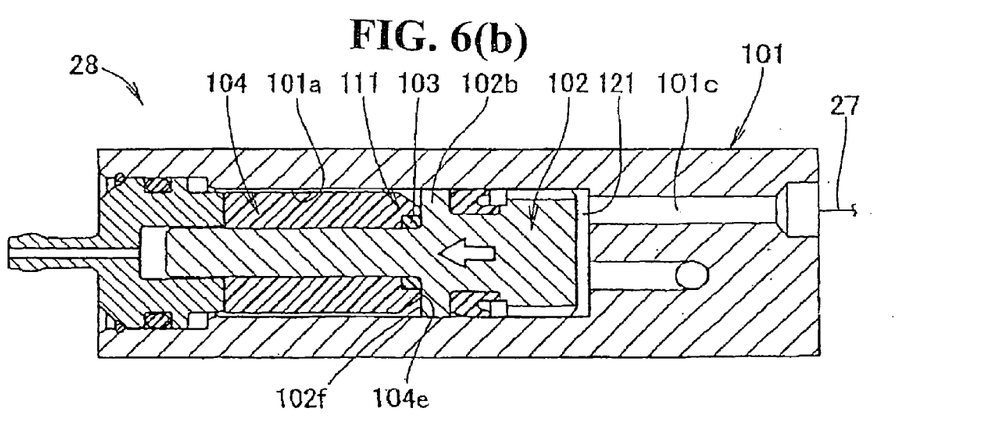
Figure 6C:
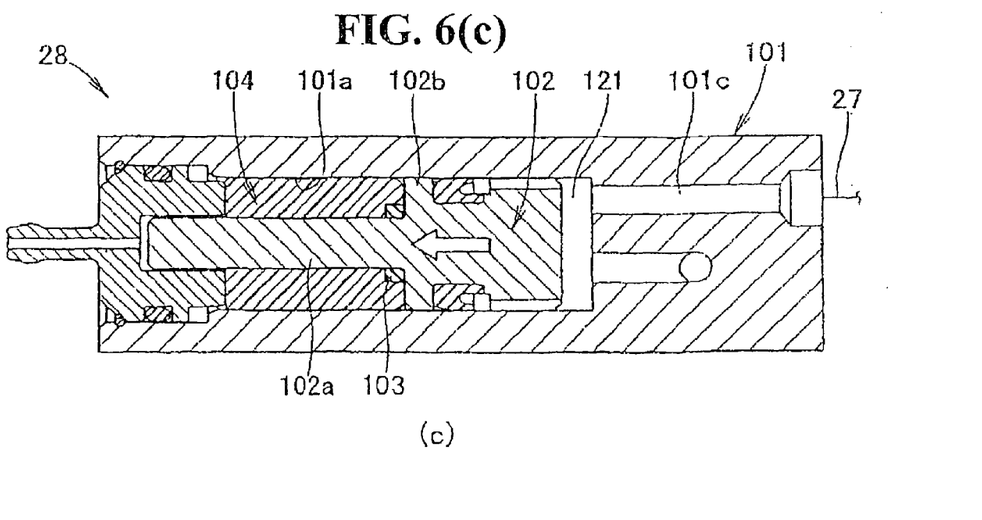

FIGS. 6(*a*)-6(*c*) are operation views of the stroke simulator according to an embodiment of the present invention.

FIG. 6(*a*) shows a state in which liquid pressure is not transmitted to the inside of the cylinder bore 101*a* of the stroke simulator 28 from the front-wheel master cylinder 25 (see FIG. 1).

In FIG. 6(*b*), the liquid pressure is transmitted to the liquid chamber 121 formed between the cylinder bore 101*a* and the piston 102 from the front-wheel master cylinder 25 (see FIG. 1). When the liquid pressure in the liquid chamber 121 is increased so that the piston 102 is moved in the inside of the cylinder bore 101*a* in the direction indicated by a blanked arrow, the first elastic member 103 having a small spring constant is compressed more than the second elastic member 104 having a spring constant larger than the spring constant of the first elastic member so that the end surface 102f of the large-diameter portion 102b of the piston 102 is brought into contact with one end surface 104e of the second elastic member 104.

As a result, the whole first elastic member 103 is accommodated in the inside of the recessed portion 111 and there is no further deformation of the first elastic member 103 by compression. Here, by suppressing a compression deformation amount of the first elastic member 103 or a stress generated in the first elastic member 103 to a predetermined value, it is possible to ensure the durability of the first elastic member 103.

During such deformation of the first elastic member 103 by compression, the front-wheel master cylinder 25 is not connected to the front-wheel disc braking device 42 shown in FIG. 5. However, the braking lever 21 generates feeling of play which is generated when the front-wheel disc braking device 42 is operated by the liquid pressure generated by the braking lever operation.

In FIG. 6(c), when the piston 102 is further moved in the cylinder bore 101a leftward in the drawing as indicated by a blanked arrow, the second elastic member 104 is deformed by compression so that the gap between the second elastic member 104 and the cylinder bore 101a, that is, the gap C2 and the chamfered portion 104c shown in FIG. 2 are almost eliminated.

Also in such a case, the braking lever 21 acquires feeling of operation which is obtained when the front wheel disc braking device 42 is operated by liquid pressure generated by the braking lever operation.

Figure 7:
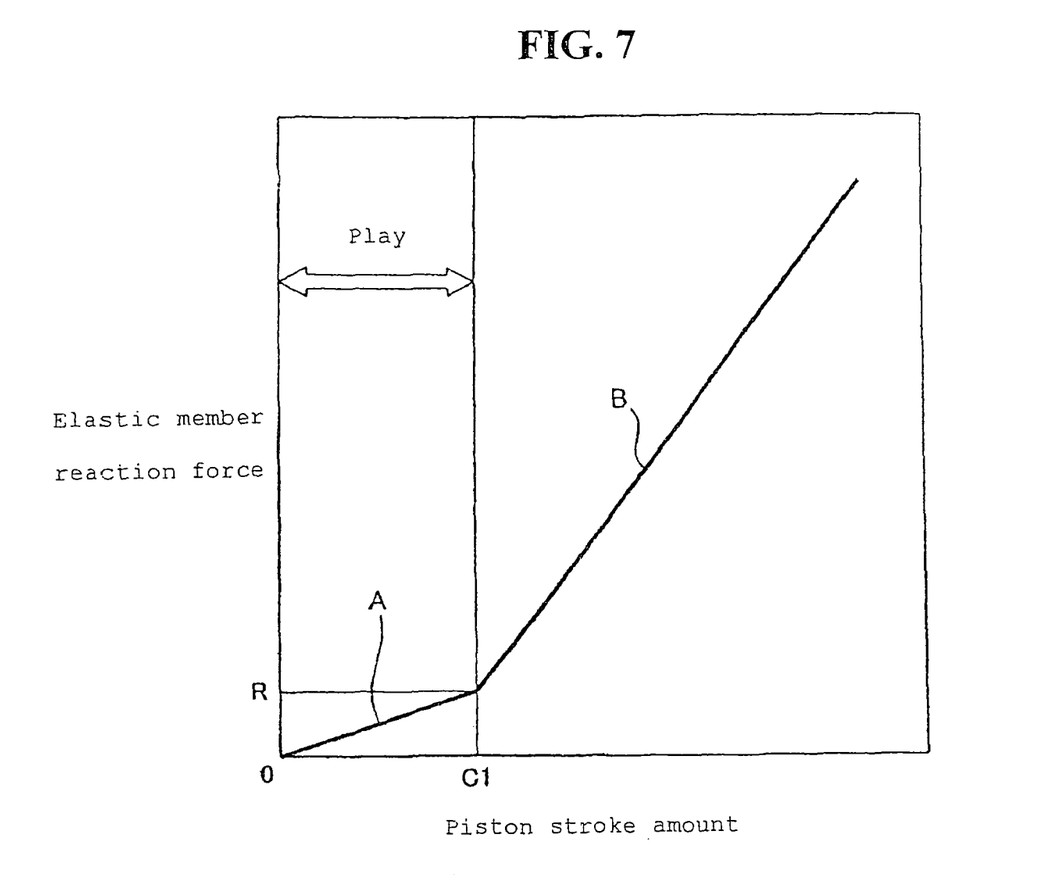
FIG. 7 is a graph showing the relationship between a reaction force of an elastic member and a piston stroke amount of the stroke simulator according to an embodiment of the present invention.

FIG. 7 is a graph showing the relationship between a reaction force of the elastic member of the stroke simulator and a piston stroke amount according to an embodiment of the present invention. The reaction force (elastic-member reaction force) which is generated in the first elastic member 103 and the second elastic member 104 shown in FIGS. 6(a)-6(c) is taken on an axis of ordinates, and a stroke amount of the piston 102 shown in FIGS. 6(a)-6(c) is taken on an axis of abscissas.

In FIGS. 6(a)-6(c) and 7, when the piston 102 starts a stroke, the elastic-member reaction force generated by the first elastic member 103 is gradually increased, and is increased until the piston stroke amount assumes the gap C1 (the gap shown in FIG. 2). The elastic-member reaction force when the piston stroke amount assumes C1 is R. The piston stroke amount C1 at this point of time corresponds to the play of the braking lever.

Thereafter, only the second elastic member 104 is compressed, and the elastic-member reaction force of the second elastic member 104 is increased along with the increase of the piston stroke amount.

The inclination (i.e., the slope) of a straight line A in the graph indicates the spring constant of the first elastic member 103, and the inclination (i.e., the slope) of a straight line B expresses a spring constant of the second elastic member 104. The graph shows that the inclination of the straight line B is larger than the inclination of the straight line A. Therefore, the spring constant of the second elastic member 104 is larger than the spring constant of the first elastic member 103.

As described above in conjunction with FIG. 1, in the illustrated embodiment of the present invention, the braking system 10 includes the front-wheel master cylinder 25 and the rear-wheel master cylinder 82 which constitute master cylinders which are operated in an interlocking manner with the operation of the braking lever 21 and the braking pedal 22 which constitute braking operation parts, the front-wheel disc braking device 42 and the rear-wheel disc braking device 84 which constitute wheel braking means which generates a braking force by liquid pressure obtained by operating the front-wheel master cylinder 25 and the rear-wheel master cylinder 82, the braking pipes 41, 41 which constitute the main braking passages which connect the front-wheel master cylinder 25, the rear-wheel master cylinder 82 and the front-wheel disc braking device 42, the rear-wheel disc braking device 84, the first solenoid-operated valves 43, 43 which constitute the normally-open first solenoid-operated open/close valves which are provided to the braking pipes 41, 41 for establishing communication between the front-wheel master cylinder 25, the rear-wheel master cylinder 82 and the front-wheel disc braking device 42, the rear-wheel disc braking device 84 or the interruption of the communication, the stroke simulators 28, 28 which apply a pseudo reaction force corresponding to the control variables of the braking lever 21 and the braking pedal 22 to the front-wheel master cylinder 25 and the rear-wheel master cylinder 82, the braking pipes 27, 27 which constitute branch passages which are branched from the first solenoid-operated valves 43, 43 of the braking pipes 41, 41 on the front-wheel-master-cylinder-25 and rear-wheel-master-cylinder-82 sides and are connected to the stroke simulators 28, 28, the second solenoid-operated valves 31, 31 which constitute the normally-closed second solenoid-operated open/close valves which are provided to the braking pipes 27, 27 for establishing the communication between the front-wheel master cylinder 25, the rear-wheel master cylinder 82 and the stroke simulators 28, 28 or the interruption of the communication, and the power units 46, 46 which constitute the hydraulic modulators which generate liquid pressure by the electrically-operated motors 60, 60 which constitute the electrically-operated actuators and operate the front-wheel disc braking device 42 and the rear-wheel disc braking device 84 with the liquid pressure, wherein the braking system 10 further includes the first pressure sensors 35, 35 which constitute the first input-side pressure sensors which are provided to the braking pipes 41, 41 for detecting the liquid pressure on the front-wheel-master-cylinder-25 and rear-wheel-master-cylinder-82 sides, and the second pressure sensors 36, 36 which constitute the second input-side pressure sensors which are provided at positions closer to the stroke-simulator-28 side than the second solenoid-operated valves 31, 31 of the braking pipes 27, 27 for detecting pressure on the stroke-simulator-28 side. Accordingly, it is possible to perform the malfunction diagnosis of these two sensors at both of the first pressure sensor 35 and the second pressure sensor 36. Further, since the braking pipes 27, 27 are closed, by providing the normally-closed second solenoid-operated valves 31, 31 to the braking pipes 27, 27, even when the large liquid pressure is generated by the front-wheel master cylinder 25 and the rear-wheel master cylinder 82, the liquid pressure is hardly applied to the second pressure sensor 36.

Further, since the measurement resolution of the second pressure sensor 36 is set higher than the measurement resolution of the first pressure sensor 35, by using the second pressure sensor 36, a liquid pressure change smaller than a liquid pressure change can be detected by the first pressure sensor 35. Therefore, a highly accurate braking control can be performed.

Further, only when the normally-closed second solenoid-operated valve 31 is opened, the pressure is applied to the second pressure sensor 36. Therefore, the second pressure sensor 36 is hardly affected by the fluctuation of pressure.

Further, the braking system 10 further includes the front-wheel wheel speed sensor 58 and the rear-wheel wheel speed sensor 86 constituting the vehicle speed sensor which detects the speed of the vehicle, and the control unit 13 which controls opening and closing of the first solenoid-operated valve 43 and the second solenoid-operated valve 31, wherein the control unit 13 controls the opening and closing of the second solenoid-operated valve 31 in accordance with a predetermined threshold value based on a value detected by the front-wheel wheel speed sensor 58 and the rear-wheel wheel speed sensor 86. Accordingly, when the control unit 13 determines that the vehicle is in a traveling state by comparing the detected values of the front-wheel wheel speed sensor 58 and the rear-wheel wheel speed sensor 86 with the predetermined threshold value, the second solenoid-operated valve 31 is opened and the liquid pressure can be measured by the high-sensitivity second pressure sensor 36. Therefore, a highly accurate braking control can be performed.

Further, when the vehicle is stopped, the second solenoid-operated valve 31 is in a closed state. Therefore, the second pressure sensor 36 is hardly affected by the fluctuation of pressure generated by the braking operation when the vehicle is stopped.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking system comprising:
   a master cylinder interlockingly operated with an operation of a braking operation part;
   wheel braking means which generates a braking force by a first liquid pressure obtained by operating the master cylinder;
   a main braking passage connecting the master cylinder and the wheel braking means;
   a normally-open first solenoid-operated open/close valve provided to the main braking passage for establishing or interrupting communication between the master cylinder and the wheel braking means;
   a stroke simulator which applies a pseudo reaction force corresponding to a control variable of the braking operation part to the master cylinder;
   a branch passage branched from the first solenoid-operated open/close valve of the main braking passage and connected to the stroke simulator;
   a normally-closed second solenoid-operated open/close valve provided to the branch passage for establishing or interrupting communication between the master cylinder and the stroke simulator;
   a hydraulic modulator which generates a second liquid pressure by an electrically-operated actuator and operates the wheel braking means with the second liquid pressure;
   a first input-side pressure sensor provided to the main braking passage for detecting a liquid pressure on the master cylinder; and
   a second input-side pressure sensor provided at a position that has a liquid passage closer to the stroke simulator than to the second solenoid-operated open/close valve of the branch passage for detecting a liquid pressure on the stroke simulator,
   wherein a measurement resolution of the second input-side pressure sensor is set higher than a measurement resolution of the first input-side pressure sensor.

2. The braking system according to claim 1, further comprising:
   a vehicle speed sensor which detects a speed of a vehicle; and
   a control unit which controls opening and closing of the first and second solenoid-operated open/close valves respectively, wherein the control unit controls opening and closing of the second solenoid-operated open/close valve in accordance with a predetermined threshold value based on the speed detected by the vehicle speed sensor.

3. The braking system according to claim 1, wherein a change of the liquid pressure on the stroke simulator is detectable by the second input-side pressure sensor only when the normally-closed second solenoid-operated open/close valve is opened.

4. The braking system according to claim 1, when a vehicle is stopped, the normally-open first solenoid-operated open/close valve is in an opened state the normally-closed second solenoid-operated open/close valve is in a closed state.

5. The braking system according to claim 4, wherein the normally-closed second solenoid-operated open/close valve is switched from the closed state to the opened state when a speed of the vehicle is higher than a predetermined speed.

6. The braking system according to claim 5, wherein the normally-open first solenoid-operated open/close valve is switched from the opened state to the closed state when the stroke simulator starts to operate, wherein the stroke simulator starts to operate when the liquid pressure on the stroke simulator detected by the second input-side pressure sensor is higher than a predetermined pressure.

7. The braking system according to claim 1, wherein the stroke simulator includes a cylinder, a piston in the cylinder, a first elastic member to be pressed by the piston, and a second elastic member to be pressed by the piston, the second elastic member accommodating a portion of the first elastic member and having a spring constant larger than a spring constant of the first elastic member.

8. A braking system of a vehicle, comprising:
   a master cylinder interlockingly operated with an operation of a braking operation part;
   wheel braking device configured to generate a braking force by a first liquid pressure obtained by operating the master cylinder;
   a main braking passage connecting the master cylinder and the wheel braking device;
   a normally-open first solenoid-operated open/close valve provided to the main braking passage for establishing or interrupting communication between the master cylinder and the wheel braking device;
   a stroke simulator which applies a pseudo reaction force corresponding to a control variable of the braking operation part to the master cylinder;
   a branch passage branched from the first solenoid-operated open/close valve of the main braking passage and connected to the stroke simulator;
   a normally-closed second solenoid-operated open/close valve provided to the branch passage for establishing or interrupting communication between the master cylinder and the stroke simulator;
   a hydraulic modulator which generates a second liquid pressure by an electrically-operated actuator and operates the wheel braking device with the second liquid pressure;
   a first input-side pressure sensor provided to the main braking passage for detecting a liquid pressure on the master cylinder; and
   a second input-side pressure sensor provided to the branch passage for detecting a liquid pressure on the stroke simulator, wherein a change of the liquid pressure on the stroke simulator is detectable by the second input-side pressure sensor only when the normally-closed second solenoid-operated open/close valve is opened, wherein a measurement resolution of the second input-side pressure sensor is set higher than a measurement resolution of the first input-side pressure sensor.

9. The braking system according to claim 8, further comprising:

a vehicle speed sensor which detects a speed of the vehicle; and a control unit which controls opening and closing of the first and second solenoid-operated open/close valves respectively, wherein the control unit controls opening and closing of the second solenoid-operated open/close valve in accordance with a predetermined threshold value based on the speed detected by the vehicle speed sensor.

10. The braking system according to claim 8, when the vehicle is stopped, the normally-open first solenoid-operated open/close valve is in an opened state the normally-closed second solenoid-operated open/close valve is in a closed state.

11. The braking system according to claim 10, wherein the normally-closed second solenoid-operated open/close valve is switched from the closed state to the opened state when a speed of the vehicle is higher than a predetermined speed.

12. The braking system according to claim 11, wherein the normally-open first solenoid-operated open/close valve is switched from the opened state to the closed state when the stroke simulator starts to operate, wherein the stroke simulator starts to operate when the liquid pressure on the stroke simulator detected by the second input-side pressure sensor is higher than a predetermined pressure.

13. The braking system according to claim 8, wherein the stroke simulator includes a cylinder, a piston in the cylinder, a first elastic member to be pressed by the piston, and a second elastic member to be pressed by the piston, the second elastic member accommodating a portion of the first elastic member and having a spring constant larger than a spring constant of the first elastic member.

* * * * *